(12) United States Patent
McClellan

(10) Patent No.: US 8,535,801 B2
(45) Date of Patent: Sep. 17, 2013

(54) FIBER FOR PRODUCING THREE-DIMENSIONAL, SELF-INTERLACING COMPOSITES

(76) Inventor: W. Thomas McClellan, Fort Lauderdale, FL (US)

( * ) Notice: Subject to any disclaimer, the term of this patent is extended or adjusted under 35 U.S.C. 154(b) by 166 days.

(21) Appl. No.: 12/685,319

(22) Filed: Jan. 11, 2010

(65) Prior Publication Data

US 2010/0112282 A1     May 6, 2010

Related U.S. Application Data

(62) Division of application No. 11/636,740, filed on Dec. 11, 2006, now Pat. No. 7,687,009.

(51) Int. Cl.
*D02G 3/00* (2006.01)
*D02G 3/36* (2006.01)
*B32B 3/10* (2006.01)

(52) U.S. Cl.
USPC ............. 428/371; 428/131; 428/133; 57/238; 57/240

(58) Field of Classification Search
USPC .............. 428/131–140, 369–371; 70/170.01, 70/170.05; 57/236; 43/42–42.74
See application file for complete search history.

(56) References Cited

U.S. PATENT DOCUMENTS

| | | | |
|---|---|---|---|
| 3,006,104 A * | 10/1961 | Allen | 43/42.15 |
| 3,966,519 A | 6/1976 | Mitchell et al. | |
| 4,198,459 A | 4/1980 | Brumlik | |
| 4,201,813 A * | 5/1980 | Brumlik | 428/97 |
| 4,891,901 A * | 1/1990 | Baker, Jr. | 43/42.11 |
| 5,935,879 A * | 8/1999 | Helwig et al. | 442/59 |
| 6,760,996 B1 * | 7/2004 | Pierson | 43/42.24 |
| 6,919,117 B1 * | 7/2005 | Kane et al. | 428/64.1 |
| 2006/0230670 A1 * | 10/2006 | Thomas, Jr. | 43/42.48 |

* cited by examiner

*Primary Examiner* — Jennifer A Chriss
*Assistant Examiner* — Ricardo E Lopez
(74) *Attorney, Agent, or Firm* — Laurence A. Greenberg; Werner H. Stemer; Ralph E. Locher

(57) ABSTRACT

A fiber includes a base having a surface to be impacted by a fluid wave for propelling the fiber forward and a body having a trailing end connected to the base, a leading free end, and a spiral shape causing the fluid wave to rotate the fiber. A locking system causes the fiber to engage and hold at least one other fiber being propelled and rotated by the fluid wave.

18 Claims, 5 Drawing Sheets

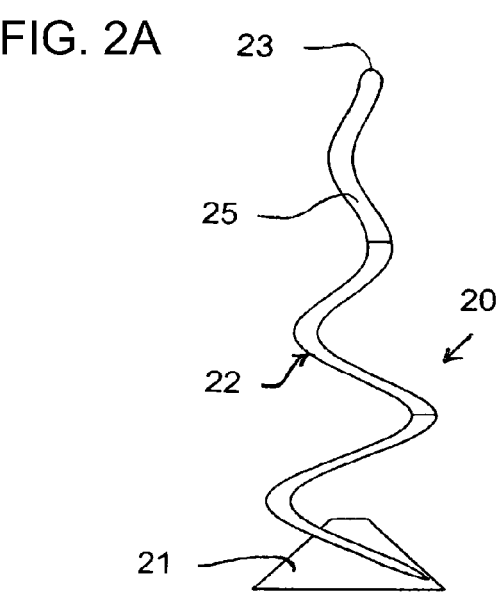
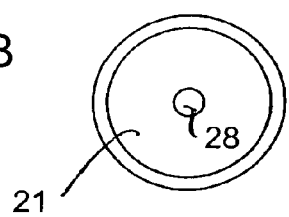
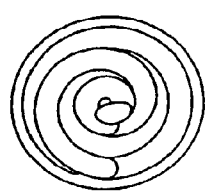
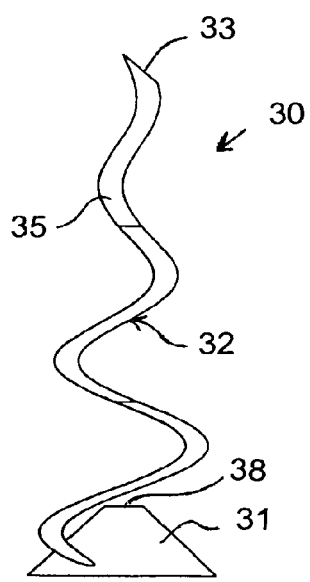

FIG. 4
FIG. 5
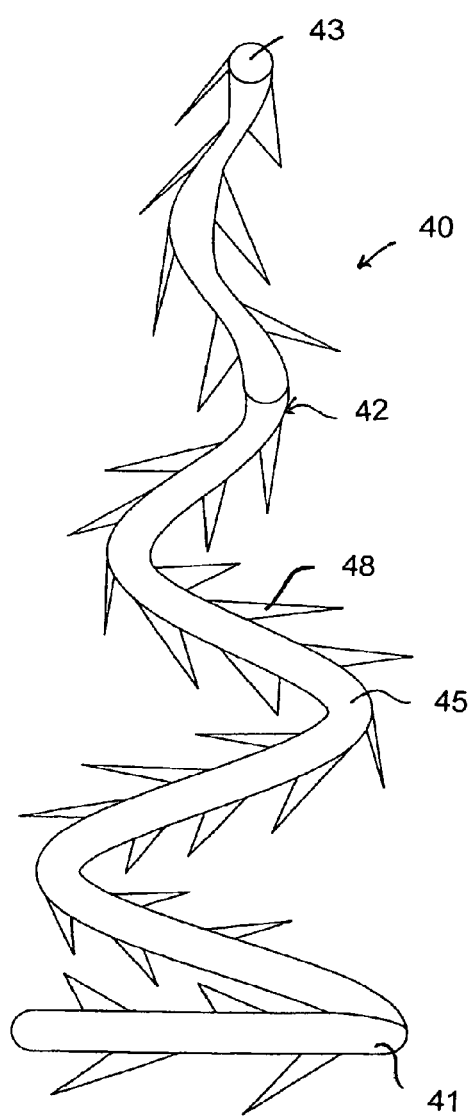
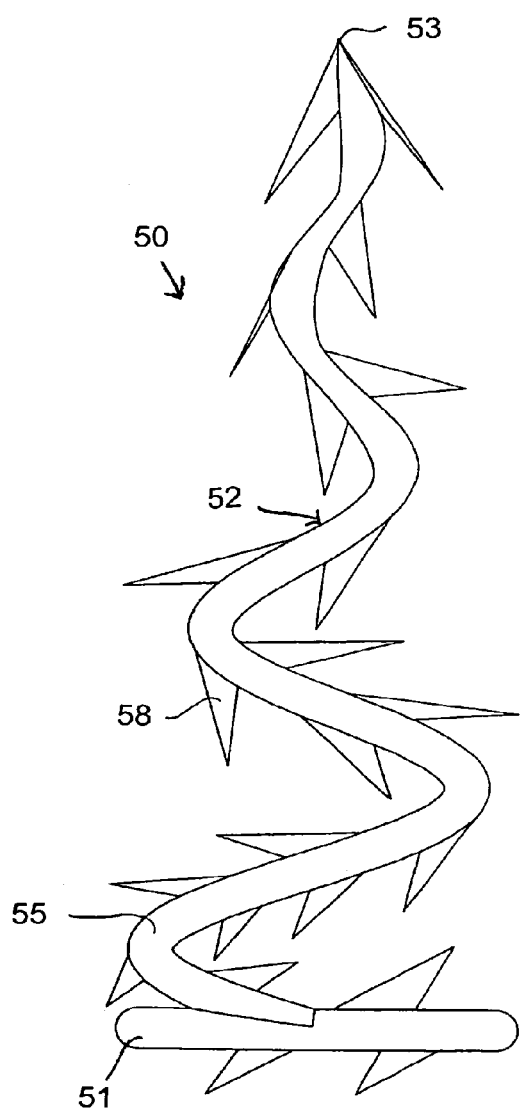

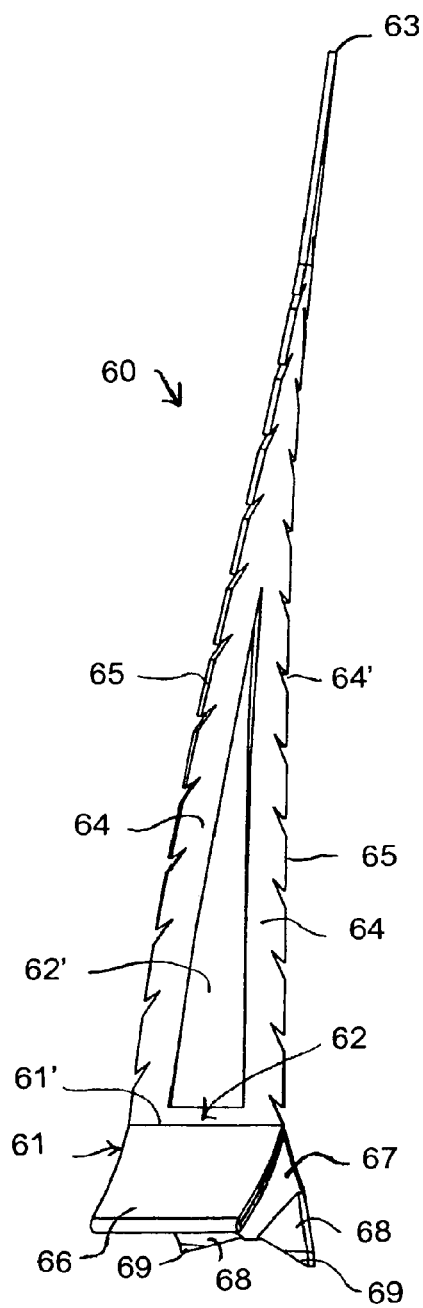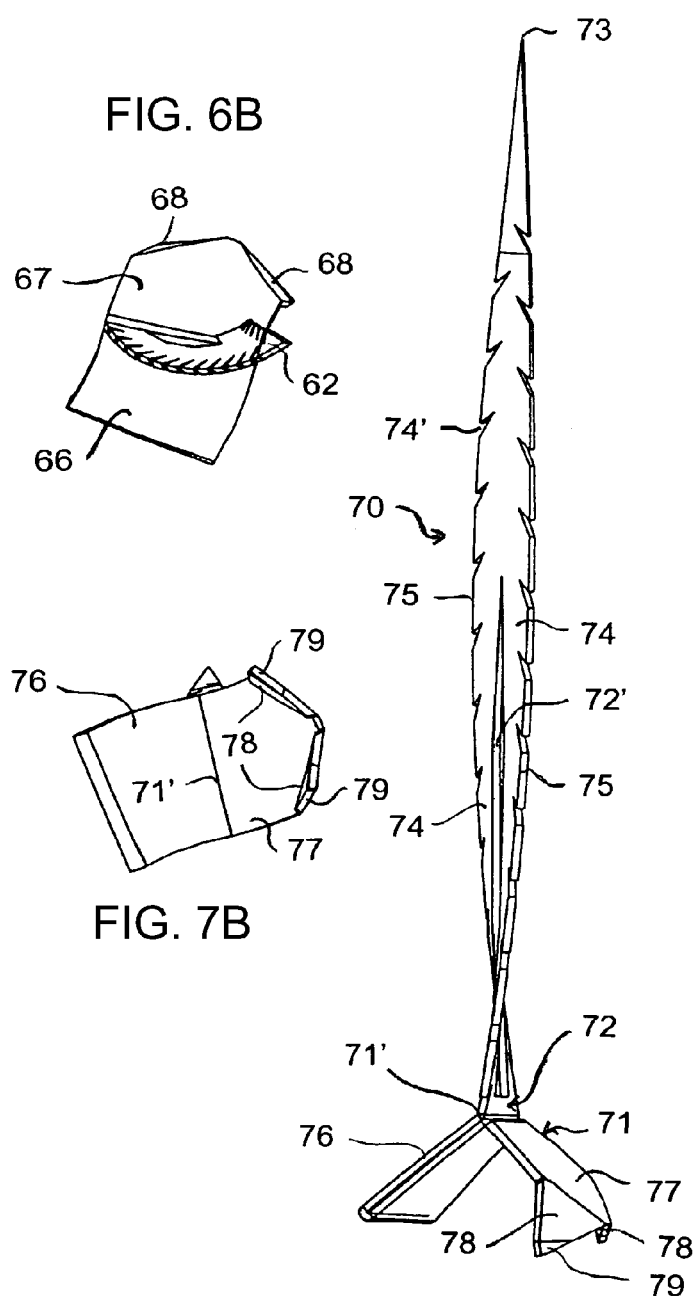
FIG. 6B
FIG. 7B
FIG. 6A
FIG. 7A

FIBER FOR PRODUCING THREE-DIMENSIONAL, SELF-INTERLACING COMPOSITES

CROSS-REFERENCE TO RELATED APPLICATION

This is a divisional application of application Ser. No. 11/636,740, filed Dec. 11, 2006; the prior application is herewith incorporated by reference in its entirety.

BACKGROUND OF THE INVENTION

1. Field of the Invention

The invention relates to a fiber for producing three-dimensional, self-interlacing composites.

2. Description of the Related Art

The reinforcing elements of most lightweight composites are high tensile strength fibers of compounds or polymers, such as fiberglass or carbon fiber or other suitable reinforcing fibers used in composites. Woven or unwoven, those layers of fibers are limited to two-dimensional interlacements. The fiber "becomes the strength" of the finished composite, and are layered into pre-made forms or molds and hardened into desired shapes by hardening binders. Different fiber patterns, fiber "tape" or even sprayed, non-interlacing short fibers fail to improve the fiber integrity. Two-dimensional orientations of the fibers give superb strength in the single plane of the XY (east-west and north-south) axis, due to crisscrossing, interlacing, or interlocking of fibers, which create "in effect" a continuous and locked fiber. Since no effective fibers run between the layers, to complete a true "vertical" interlocking in the third dimension, those materials have a much reduced strength in this Z (front to back) axis. It is only in flat or gently curving forms like boats or tubes, where the material can be formed with good overlap, minimal distortion or cutting of the fibers and where stresses can be restricted to the two dimensions or "in plane" with the directions of interlacements, that the strength of the composite is preserved. The fibers' own rigidity restricts stretching and makes layering in irregular or hyper-contoured molds very difficult. To fold, distort or cut the remaining interlinking or to use chopped fibers which have zero interlinking is so destructive to strength integrity as to make the techniques unwise.

A contoured composite object, formed with destroyed XY axis strength (no interlinking) and no Z axis strength (no interlinking) has little tensile strength in any direction, and failures or delaminations occur because there are no remaining effective strength elements, just a "weak glued-together mixture". The integrity of the fiber continuity is everything in composites because the hardening binders carry no significant portion of the stress loads.

SUMMARY OF THE INVENTION

It is accordingly an object of the invention to provide a fiber and a process for producing three-dimensional, self-interlacing composites by mechanical polymerization with ultrasonic manipulation, which overcome the hereinafore-mentioned disadvantages of the heretofore-known fibers and processes of this general type and which provide improved strength in three axial directions.

According to the invention, the "lack of cross-linking" failure is overcome by creating an effective mechanical method for cross-linking of the fibers in a true three dimensional, three (XYZ) axis array for an enhanced quality, and high tensile strength in complex composite shapes.

With the foregoing and other objects in view there is provided, in accordance with the invention, a fiber. The fiber comprises a base having a surface to be impacted by a fluid wave for propelling the fiber forward and a body having a trailing end connected to the base, a leading free end, and a spiral shape causing the fluid wave to rotate the fiber. A locking system causes the fiber to engage and hold at least one other fiber being propelled and rotated by the fluid wave. The fibers are locked together in random positions in three dimensions, providing increased strength and integrity of a composite formed of the fibers in the X, Y and Z directions.

In accordance with another feature of the invention, the surface of the base is concave, hemispherical, frustoconical, substantially unobstructed or provided by two webs describing an acute angle therebetween. In each of these embodiments, a surface is provided to be impacted by the waves for propagation in substantially one general direction. The webs may include one flat and one structured web together imparting turbulence to the fiber.

In accordance with a further feature of the invention, the body has at least one gap formed therein, such as between nodes of intertwined arms and/or the base has a hole formed therein and/or the body has protrusions or teeth disposed thereon and/or the body is a single arm bent in a spiral. The leading free end has a tip with a blunt, rounded, pointed or flat shape. The locking system includes the at least one gap, hole, protrusions, teeth or spiral arm and the leading free end engaging and holding the same in at least one other fiber. Thus, a reliable interlinking occurs, due to the locking system, in three dimensions.

In accordance with an added feature of the invention, the entire fiber is formed of carbon or fiberglass or most any high tensile strength material used in composites.

With the objects of the invention in view, there is also provided a process for producing three-dimensional, self-interlacing composites by mechanical polymerization with ultrasonic manipulation. The process comprises placing fibers according to the invention and a mixing fluid in a form or mold. The fluid is subjected to ultrasonic manipulation in a mixing step causing the fibers to be propelled, rotated and three-dimensionally engaged and held to one another.

In accordance with another mode of the invention, the mixing fluid includes a resin or binder or a resin or binder is added to the mixing fluid. After the mixing step, additional premixed fibers are compressed into the form or mold for achieving a desired fiber density. If necessary, the mixing liquid is then evacuated, and the resin or binder and the engaged fibers are then allowed to harden. The fibers are bonded into a composite by setting, hardening or polymerizing with the resin or binder. The mixing liquid may be alcohol or water. The fibers may have lengths between 1 mm and several centimeters and aspect ratios of length to width of from 2:1 to 50:1.

In accordance with a further mode of the invention, the ultrasonic manipulation of the fibers is controlled for three-dimensionally engaging the fibers and substantially fill all regions of the form or mold. In this way, a uniform strength is provided throughout the composite.

In accordance with an added mode of the invention, the fibers are propelled by impacting a fiber surface having a shape which is concave, hemispherical, frustoconical, flat or acute-angled. This ensures that the fibers will move in a desired direction in the liquid.

In accordance with a concomitant mode of the invention, the fibers are engaged and held together by causing the leading free ends of the fibers to penetrate gaps or holes in other fibers during the mixing step. Alternatively or additionally, the fibers are engaged and held together by causing protrusions or teeth of the fibers to interlock during the mixing step.

Fibers and methods are presented to effectively cause self-interlacing (mechanical linking of independent elements into chains), cross-linking and locking of the fibers in situ (within the form or mold), by ultrasonic manipulation. The term ultrasonic, in this context, is defined in the broadest definition, and extends from the upper sound frequencies to the mid microwave frequencies.

A new element or fiber is constructed to be affected by and set in motion by the application of ultrasonic energy through ultrasonic transducers, variable in frequency, amplitude, timing, pulse width and relative angles, attached externally to the walls of the form or mold and used in a synergistic manner. Ultrasonic wave stimulation increases the velocity or energy of the individual liquid molecules and because of this "more excited state", the molecules begin a synergistic "movement in unison" or the phenomenon of "standing waves" in liquids. Standing waves occur at many frequencies with wave tip to wave tip distances inversely proportional to the frequency. This "movement in unison" is not confined to the surface but exists through out the liquid.

The normally non-excited, non-usable "random molecular motion" has been raised to a higher order of "oscillations in synchronism" or "standing waves" according to the invention. This higher energy "cooperative motion" is controllable, steerable and therefore "usable" if focused on susceptibly shaped elements or fibers. The obstacle of directly manipulating elements or fibers by external energy is overcome by using the fluid medium itself, as the intermediate link to affect the susceptible fibers. A connection is established between the energy and the fluid as well as between the fluid and the fiber, and a much sought after "energy controllable fiber" is provided. These elements or fibers with specific structural features, which give them a "directional sensitivity", have the ability to capture these physical impacts of molecules, particles or standing waves within the liquid, and be propelled in "linear motion" converting transduced energy into "work".

Other features which are considered as characteristic for the invention are set forth in the appended claims.

Although the invention is illustrated and described herein as embodied in a fiber for producing three-dimensional, self-interlacing composites, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIGS. 2A and 2B are respective front-elevational and bottom-plan views of a second embodiment of a fiber according to the invention;

FIGS. 3A and 3B are respective front-elevational and top-plan views of a third embodiment of a fiber according to the invention;

FIG. 4 is a front-elevational view of a fourth embodiment of a fiber according to the invention;

FIG. 5 is a front-elevational view of a fifth embodiment of a fiber according to the invention;

FIGS. 6A and 6B are respective front-perspective and top-perspective views of a sixth embodiment of a fiber according to the invention; and FIGS. 7A and 7B are respective front-perspective and bottom-perspective views of a seventh embodiment of a fiber according to the invention.

DESCRIPTION OF THE INVENTION

Figure 1B:
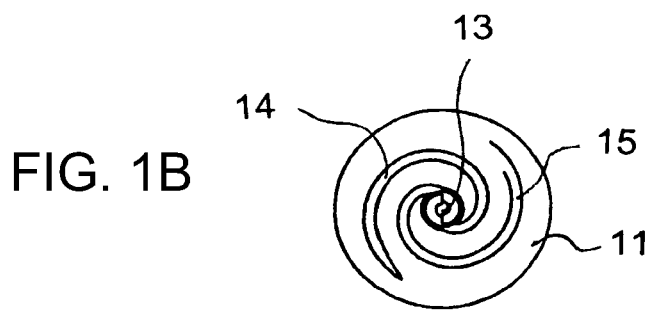
FIGS. 1A, 1B and 1C are respective diagrammatic, front-elevational, top-plan and bottom-plan views of a first embodiment of a fiber according to the invention.
Figure 1A:
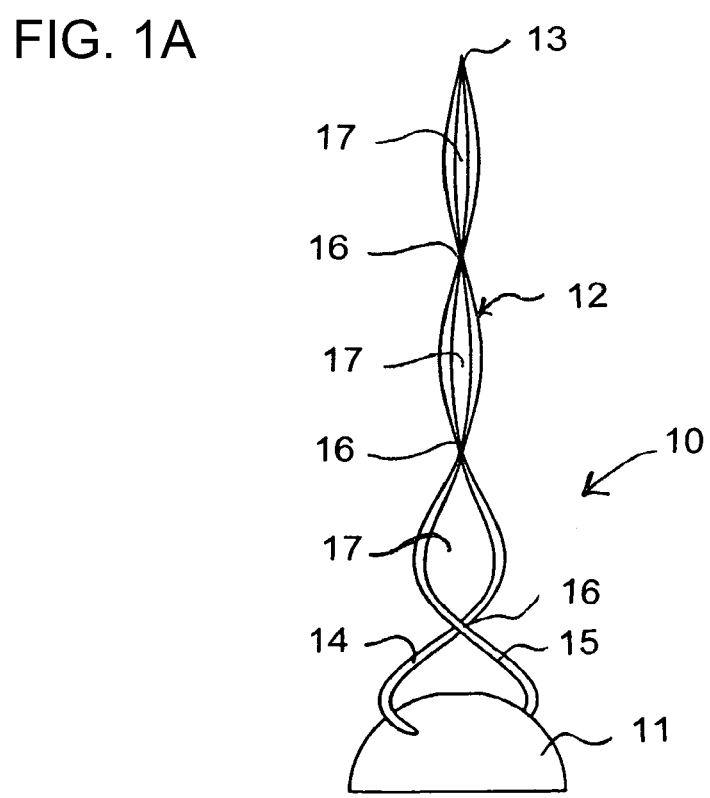
Figure 1C:
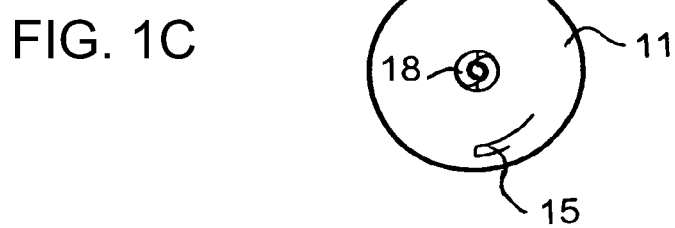

Referring now to the figures of the drawings in detail and first, particularly, to FIG. 1A thereof, there is seen a first embodiment of a fiber or element 10 having a base 11 and a body 12. The body has a trailing end attached to the base and a leading free end. It can be seen from FIGS. 1A and 1B that the body 12 is spirally wound from the base 11 to a tip 13 at the leading free end of the body 12. The spiral shape is created by twisting arms 14, 15 about one another to form connecting nodes 16 and gaps 17 between the nodes in the body 12. The sizes of the gaps 17 increase toward the base 11. One or both of the arms can penetrate the base 11, as is shown by the arm 15 in FIG. 1C. It is also seen from FIG. 1C, which is a view from the bottom of FIG. 1A, that the base 11 is hemispherical or dome-shaped with a hole 18 formed therein and that the bottom thereof is concave. The surface of the base 11 to be impacted by a fluid wave is therefore a concave surface.

Therefore, the base 11 of the fiber 10 provides a generally concave gathering, capturing or impact energy summing surface in one direction and the base 11 and the body 12 provide generally convex shedding, deflecting or energy impact reducing surfaces as seen from the opposite direction. The concave surface of the base 11 is an impact summing shape because more of the impacts of molecules, particles or waves strike the surface at a higher angle of incidence, imparting more energy and with a higher percentage of secondary or "summation strikes" because the angle of reflectance still falls within the surface of the concavity. The convex shape of the surface of the base 11 and the body 12 is an impact reducing shape because more of the molecules, particles or waves strike the surface at lower angles of incidence, imparting less energy and an almost zero percentage of secondary summation strikes since the angles of reflectance fall outside the surface of the convexity.

When the fibers 10 are subjected to a current caused by ultrasonic waves in a liquid in a form or mold, the fibers respond due to the fundamental features of their construction described above and move by intention in a controllable way, and due to other features of their construction, to seek out, interlink and interlock with other similar fibers in a semi-random but controlled "true three dimensional" cross-linked manner. The tips 13 of the fibers 10 can be driven into the gaps 17 of other fibers 10, in a circular "stirring" motion caused by the spiral shape of the body 12. They may be driven toward the center of the mold, driven toward one or more outer walls or into hard-to-fill contours of molds by controlling variables of the directable ultrasonic energy. The tips, bases and gaps in the bodies of such fibers form a locking system engaging and holding the fibers together.

More specifically, with regard to the process according to the invention, the fibers 10 are loaded into a form or mold, which already contains a low to medium viscosity mixing liquid. The mixing liquid may be an intended or parent resin or binder "without catalyst," if of suitable low viscosity, or other compatible liquids, which can be easily removed, such as alcohol or water. Any of the typical two-part resins or epoxies used with catalysts, which bond composites by setting, hardening, or polymerizing, may be used as the resin or binder. The liquid and the fibers 10 then react to the increased molecular activity and waveforms described herein, related to transducer stimulation.

Interlinking begins and the uniting fibers 10 uniformly fill all areas of the form or mold regardless of its contours. The mechanical polymerization of the fibers requires a low to medium density liquid or fluid for the fibers to maneuver and interlink, but proper composites require compressed fibers and a high ratio in the fiber to binder content. Therefore, at the conclusion of the desired mixing, an adjacent column or "sprue" of surplus, similarly mixed fibers, are compressed into the form or mold to introduce additional three-dimensionally, pre-mixed fibers, for achieving proper fiber density and evacuation of the mixing liquid.

The resin or binder (if different from the mixing liquid) is then introduced throughout the compressed, uniformly interlaced fiber mass and allowed to harden. Proper fiber density is generally accepted as the maximum amount of adequately wetted fiber to the minimum amount of binder.

Formed or molded objects of almost unlimited contour or complexity can now be made from the most simple to the most exotic composite materials with a three-dimensional tensile strength never before achieved. The ability to cast complex objects in composites such as carbon fiber, is new in the art.

More specifically, with regard to the fibers or elements, it is noted that they may be made of any suitable material, are widely variable in size because of the vast choices involved and variations of the interlocking technique, type and size of materials, binders, ultimate strength desired, and size of the objects formed. Lengths as short as 1 mm to many centimeters in length can be possible with this process, as well as aspect ratios of length to width of two to one, up to fifty to one.

Although the structure of the fibers or elements and the process of producing the composites is described above with regard to the first embodiment of the invention, those descriptions can be applied to the second through seventh embodiments described below as well.

A second embodiment of a fiber or element 20 shown in FIGS. 2A and 2B and a third embodiment of a fiber or element 30 shown in FIGS. 3A and 3C, both have frustoconical bases 21, 31 and a single spirally-wound arm 25, 35. A tip 23 at a leading free end of a body 22 attached to the base 21 of the second embodiment of the fiber 20 is rounded. However, a tip 33 at a leading free end of a body 32 attached to the base 31 of the third embodiment of the fiber 30 is pointed. Once again, the bases 21, 31 are concave as seen in FIG. 2B or from the bottom of FIGS. 2A and 3A, but convex as seen from the top of FIGS. 2A and 3A, and have holes 28, 38, formed therein. The surface of the base 21, 31 to be impacted by a fluid wave is therefore a concave surface. It is clear that a wave traveling through liquid containing such fibers 20, 30 will impart a circular forward motion with the tips 23, 33 leading, to cause the bodies 22, 32 to become intertwined. The tips, bases and bodies of such fibers form a locking system engaging and holding the fibers together.

Figure 5A:
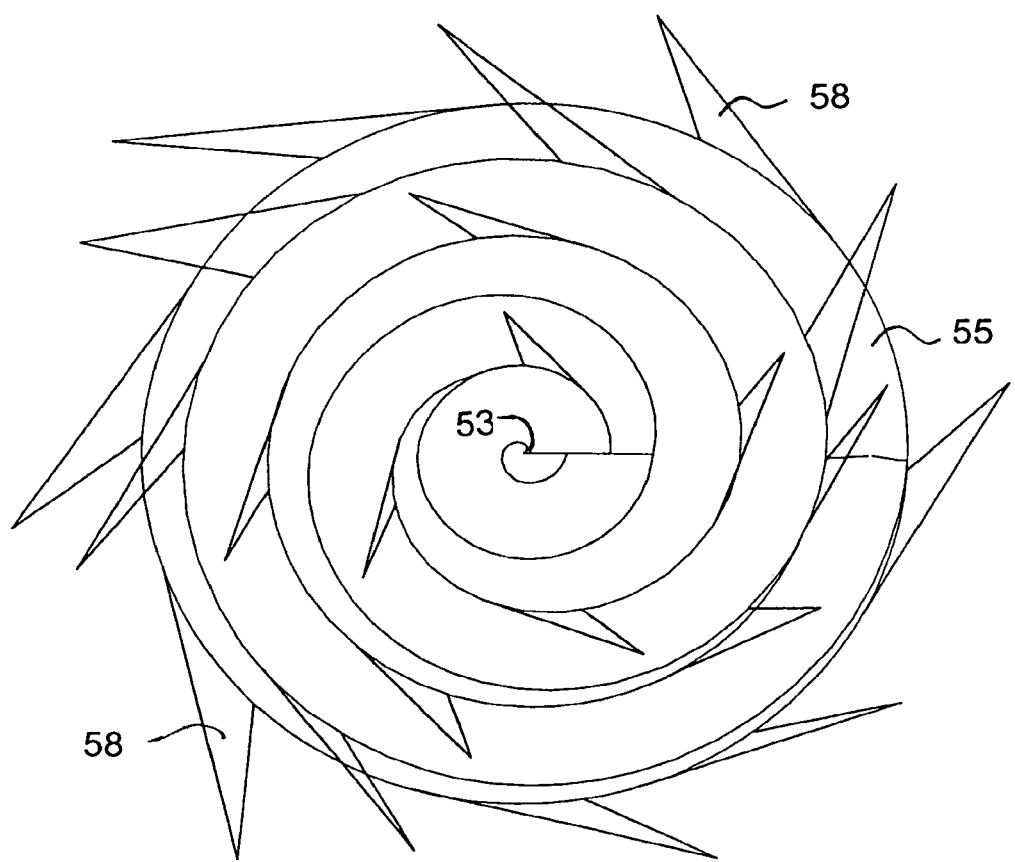
FIG. 5A is a top-plan view of the fifth embodiment of the fiber, shown in FIG. 5.

In a fourth embodiment according to FIG. 4 and in a fifth embodiment according to FIG. 5, respective fibers or elements 40, 50 have bases 41, 51 and bodies 42, 52 connected thereto. The bodies 42, 52 each have a respective single spirally-shaped arm 45, 55 with respective fins 48, 58 integral therewith. The fins or protrusions may be attached to the arms or formed in one-piece therewith and extend in different directions. Although the body 42 has a tip 43 at a leading free end with a substantially circular shape, a tip 53 at a leading free end of the body 52 is pointed. The top-plan view of FIG. 5A shows the appearance of the arm 55 and fins 58 from above. Due to the large and generally or substantially unobstructed surface area of the bottom of the bases 41, 51, a wave traveling through liquid will impact most greatly on the bottom of the bases and cause the fibers to travel ahead with the tips leading. The fibers will become interlocked at the fins and the bodies. The bases can also have a non-illustrated concave shape as seen from the bottom of FIGS. 4 and 5. The tips, bases and fins on the bodies of such fibers form a locking system engaging and holding the fibers together.

The sixth embodiment illustrated in FIGS. 6A and 6B and the seventh embodiment illustrated in FIGS. 7A and 7B respectively show fibers or elements 60, 70 having bases 61, 71 connected to bodies 62, 72 at apexes 61', 71'. It is seen that although both bodies 62 and 72 have a certain spiral twist, the body 72 is twisted more than the body 62.

Regarding the embodiment of FIGS. 6A and 6B, it is seen that the body 62 has a flat or blunt tip 63 at a leading free end and a triangular slot or gap 62', dividing the body into two arms 64 over a portion of its length. The arms 64 have slits 64' formed therein, defining teeth 65 on the arms. The base 61 has a planar web 66 and a structured web 67, which can also be seen in FIG. 6B. The webs meet at the apex 61'. The structured web 67 has bent portions 68 which in turn have additional bent portions 69.

Regarding the embodiment of FIGS. 7A and 7B, it is seen that the body 72 has a pointed tip 73 at a leading free end and a triangular slot or gap 72', dividing the body into two arms 74 over a portion of its length. The arms 74 have slits 74' formed therein, defining teeth 75 on the arms. The base 71 has a planar web 76 and a structured web 77 meeting at the apex 71', which can also be seen in FIG. 7B. The structured web 77 has bent portions 78 which in turn have additional bent portions 79.

The surface of the base 61, 71 to be impacted by a fluid wave is therefore formed of surfaces of the two webs 66, 67 and 76, 77 that describe an acute angle therebetween.

Once again, the concave shape of the bases 61, 71, as seen from below, will cause the waves to move the fibers forward with the tips 63, 73 leading. The twisted shape of the bodies will impart a spiral motion as well. Therefore, the tips 63, 73, the teeth 65, 75, the webs 66, 67, 76, 77 and the slots or gaps 62', 72' will become impaled on one another, locking the fibers together. The flat webs 66, 76 and structured webs 67, 77 together impart turbulence to the fiber.

The tips, bases and teeth and slots or gaps of the bodies of such fibers form a locking system engaging and holding the fibers together.

It should also be understood that the fibers of two or more of the embodiments described above can be mixed together in a mold.

These self-interlacing, interlinking elements or fibers of the seven embodiments described above each have one or more of the following physical features:

1. One or more motion-inducing surfaces, such as the bases, bodies, fins and teeth, causing the element or fiber to move in a nonrandom, intentional direction of motion within a fluid when acted upon by an oscillation-type, external energy introduced into the system and reacting with the fluid or liquid molecules or particles. These one or more motion inducing surfaces may be isolated, grouped, separated or placed more uniformly along a greater portion of the element.

2. Motion-inducing surfaces on the element or fiber, such as the concave surfaces of the bases, having generally concave or other effectively shaped surfaces to gather, contain and concentrate the sum of the vector forces or impacts by the oscillating fluid or liquid molecules, particles or standing waves, acting on the element or fiber, and having these concavities facing generally away from the direction of intended motion.

3. Motion-inducing surfaces on the element or fiber, such as the bodies and convex surfaces of the bases, having generally convex or other effective shaped surfaces to shed, deflect, or reduce the sum of the vector forces or impacts by the oscillating fluid or liquid molecules, particles or standing waves acting on the element or fiber and having these convexities facing generally in the direction of intended motion.

4. A generally-changing overall spiral shape, in both diameter and rate of spiral, such as the bodies, to initiate or assist in an intentioned rotational motion generally at right angles to the intended linear motion. The portion toward the direction of intended linear motion would have the least spiral per degree of rotation and appear almost inline with the linear axis of the element and the portion toward the stem or base or away from the direction of intended linear motion would have increasing spiral appearing generally almost or at right angles to the axis of the element and direction of linear motion.

5. Other separate spiral-shaped elements or fibers as described in item 4, such as the fins or teeth, formed in a "mirror image" or with oppositely oriented features as to cause rotation in the opposite or reverse direction, as in clockwise to counter clockwise manners, to increase and improve interlinking by adding more competing angles of interactions and more lateral areas for engagement.

6. An offset pivot point of linear axial movement which will cause the forward point or points of the fiber or element in its intended linear motion and its simultaneous intended rotational motion to "hunt or seek", with a pivoting or searching motion to enhance the finding, impaling, engaging and/or interlinking with the other similar elements or fibers. The element or fiber having this offset "pivot point of rotation", is located at a point along the element at approximately 10% to 40% of its total length, as measured from bow or pointed tip to stern.

7. One or more pointed end portions, teeth or fins of the element or fiber, in the direction of nonrandom or intended direction of motion, intended to initiate, assist and accomplish the impaling, engagement and interlinking of or into other similar elements or fibers.

8. A surface or surfaces, such as at the slots or gaps, holes, slits, teeth, fins and webs on the elements or fibers, intended to receive the pointed end portion or portions of other elements to assist and accomplish the interlinking of and with other similar elements or fibers.

9. A surface or surfaces, such as at the slots or gaps, slits, teeth, fins and webs on the elements or fibers, which once engagement and interlinking is accomplished, attempt or tend to hold the other similar elements or fibers engaged or interlinked.

The invention claimed is:

1. A fiber, comprising:
a base having a first surface and an opposing second surface, said second surface having a concave shape configured to be impacted by a fluid wave such that the fiber is propelled forward;
a body having a trailing end connected to said base at said first surface, a leading free end, and a spiral shape causing the fluid wave to rotate the fiber, said body extending outward from said first surface; and
a locking system causing the fiber to engage and hold at least one other fiber being propelled and rotated by the fluid wave;
wherein said base, said body and said engagement system are formed of fiberglass.

2. The fiber according to claim 1, wherein said surface of said base is a concave surface.

3. The fiber according to claim 1, wherein said base has a shape selected from the group consisting of hemispherical and frustoconical.

4. The fiber according to claim 1, wherein said surface of said base is a flat, substantially unobstructed surface.

5. A fiber, comprising:
a base having a surface to be impacted by a fluid wave for propelling the fiber forward, said surface of said base being formed of surfaces of two webs describing an acute angle therebetween;
a body having a trailing end connected to said base, a leading free end, and a spiral shape causing the fluid wave to rotate the fiber; and
a locking system causing the fiber to engage and hold at least one other fiber being propelled and rotated by the fluid wave.

6. The fiber according to claim 5, wherein said webs include one flat and one structured web together imparting turbulence to the fiber.

7. The fiber according to claim 3, wherein said base has a hole formed therein, and said locking system includes said hole and said leading free end engaging and holding in said hole in another fiber.

8. The fiber according to claim 1, wherein said first surface of said base is larger than an end face of said trailing end.

9. A three-dimensional self-interlacing composite, comprising:
at least two fibers, each fiber of said at least two fibers including:
a base having a first surface and an opposing second surface, said second surface having a concave shape configured to be impacted by a fluid wave such that the fiber is propelled forward;
a body having a trailing end connected to said base at said first surface, a leading free end, and a spiral shape causing the fluid wave to rotate the fiber, said body extending outward from said first surface; and
a locking system causing the fiber to engage and hold at least one other fiber being propelled and rotated by the fluid wave;
said at least two fibers being interlinked by the locking systems of said at least two fibers.

10. The fiber according to claim 1, wherein said body has at least one gap formed therein, and said locking system includes said at least one gap and said leading free end engaging and holding in said at least one gap in at least one other fiber.

11. The composite of claim 9, wherein said body has two intertwined arms crossing each other at connecting nodes and forming said at least one gap between said connecting nodes.

12. The composite of claim 9, wherein said body has protrusions disposed thereon engaging and holding on said protrusions on at least one other fiber to form said locking system.

13. The composite of claim 9, wherein said body is a single arm bent in a spiral.

14. The composite of claim 9, wherein said body has teeth formed thereon engaging and holding on said teeth on at least one other fiber to form said locking system.

15. The composite of claim 9, wherein said body is a single arm bent in a spiral.

16. The composite of claim 9, wherein said leading free end has a tip with a shape selected from the group consisting of blunt, rounded, pointed and flat.

17. The composite of claim 9, wherein at least a portion of said trailing end penetrates said base and extends to said second surface of said base.

18. A three-dimensional self-interlacing composite, comprising:
- a first fiber including:
  - a base having a first surface and an opposing second surface, said opposing second surface configured to be impacted by a fluid wave such that the fiber is propelled forward;
  - a body having a trailing end connected to said base at said first surface, a leading free end, and a spiral shape causing the fluid wave to rotate the fiber, said body tapering to a tip at said leading free end, said body extending outward from said first surface; and
  - a locking system causing the fiber to engage and hold at least one other fiber being propelled and rotated by the fluid wave;
- at least a second fiber including:
  - a base having a first surface and an opposing second surface, said opposing second surface to be impacted by a fluid wave for propelling the fiber forward;
  - a body having a trailing end connected to said base at said first surface, a leading free end, and a spiral shape causing the fluid wave to rotate the fiber; and
  - a locking system causing the fiber to engage and hold at least one other fiber being propelled and rotated by the fluid wave;
- the first fiber and the second fiber being interlinked by the locking systems of said first and second fibers.

* * * * *